(12) United States Patent
McGregor

(10) Patent No.: US 6,240,436 B1
(45) Date of Patent: May 29, 2001

(54) HIGH SPEED MONTGOMERY VALUE CALCULATION

(75) Inventor: Matthew Scott McGregor, Huntington Beach, CA (US)

(73) Assignee: Rainbow Technologies, Inc., Irvine, CA (US)

(*) Notice: Subject to any disclaimer, the term of this patent is extended or adjusted under 35 U.S.C. 154(b) by 0 days.

(21) Appl. No.: 09/050,573

(22) Filed: Mar. 30, 1998

(51) Int. Cl.$^7$ .................................. G06F 7/38; H04L 9/00
(52) U.S. Cl. ................................ 708/491; 380/46; 380/28
(58) Field of Search .................................. 380/28, 30, 1, 380/46, 44; 713/189, 192; 708/491, 492

(56) References Cited

U.S. PATENT DOCUMENTS 5,274,707 * 12/1993 Schlafly ................................. 380/30
5,513,133 * 4/1996 Cressel et al. ....................... 364/754

FOREIGN PATENT DOCUMENTS 0 601 907 A2   6/1994 (EP).
0 785 503 A1   7/1997 (EP).

OTHER PUBLICATIONS

Montgomery, "Modular Multiplication Without Trial Division," Mathematics of Computation, vol. 44, No. 170, pp. 519–521, Apr. 1985.*
European Search Report in EP 98 30 8207 dated Jul. 27, 1999.
Comba, P.G., "Exponentiation Cryptosystems on the IBM PC", IBM Systems Journal, vol. 29, No. 4, Jan. 1, 1990, pp. 526–538.
Bond, Dieter et al., "Optimized Software Implementations of the Modular Exponentiation on General Purpose Microprocessors", Computers & Security Journal, vol. 8, No. 7, Nov. 1, 1989, pp. 621–630.
Shand, M. et al., "Fast Implementations of RSA Cryptography", Proceedings of the Symposium on Computer Arithmetic, Windsor, Ontario, 11th Symposium, Jun. 29–Jul. 2, 1993, IEEE, pp. 252–259.
Quisquater, J.J. et al., "Fast Decipherment Algorithm for RSA Public–Key Cryptosystem", Electronics Letters, vol. 18, No. 21, Oct. 14, 1982, pp. 905–907.
Koc, Cetin Kaya et al., "Analyzing and Comparing Montgomery Multiplication Algorithms", IEEE Micro, vol. 16, No. 3, Jun. 1, 1996, pp. 26–33.
Copy of European Search Report for related European Patent Application No. 98 301 533.0.

* cited by examiner

Primary Examiner—Tod R. Swann
Assistant Examiner—Steve Kabakoff
(74) Attorney, Agent, or Firm—Foley & Lardner

(57) ABSTRACT

A method and apparatus for performing high-speed computation of a Montgomery value defined as $2^{2k} \bmod(n)$ for an arbitrary modulus n is disclosed. After loading the value of $2^{(h*m)+1}$ into a first register and the value of the modulus n in a second register, the bits of modulus n are shifted in a most significant bit direction before a repeated modular reduction and squaring process. This allows the computation of the Montgomery value for modulus values of arbitrary sizes while reducing the number of computations required by a processor with a limited operand size.

14 Claims, 9 Drawing Sheets

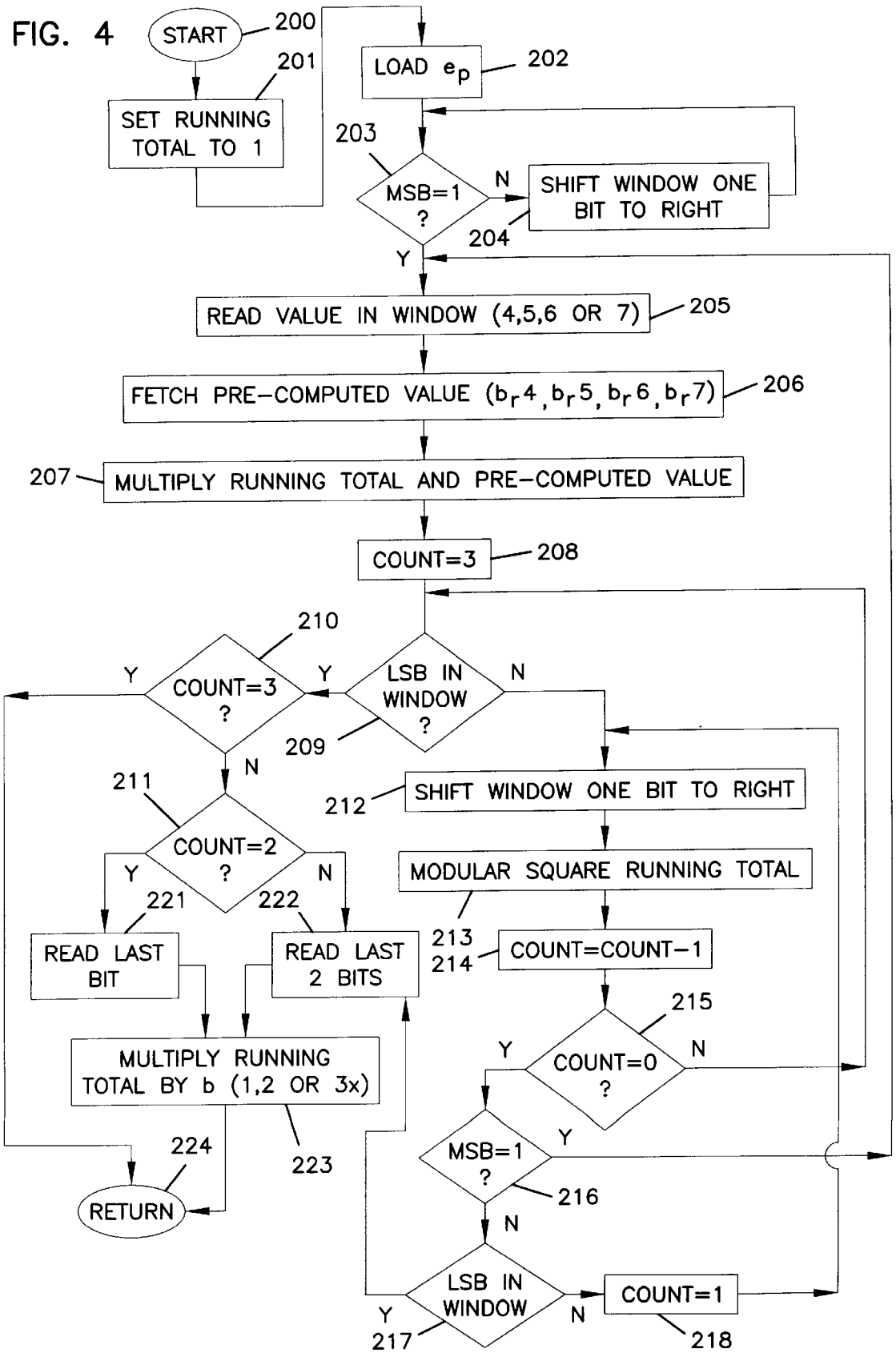

| SHIFT NO. | WINDOW VALUE | NET EXPONENTIATION VALUE |
|---|---|---|
| 0 | 1011010011 | $b^5$ |
| 1 | 1011010011 | $(b^5)^2$ |
| 2 | 1011010011 | $((b^5)^2)^2$ |
| 3 | 1011010011 | $((((b^5)^2)^2)^2)*b^5$ |
| 4 | 1011010011 | $(((((b^5)^2)^2)^2)*b^5)^2$ |
| 5 | 1011010011 | $((((((b^5)^2)^2)^2)*b^5)^2)^2$ |
| 6 | 1011010011 | $(((((((b^5)^2)^2)^2)*b^5)^2)^2)^2$ |
| 7 | 1011010011 | $((((((((b^5)^2)^2)^2)*b^5)^2)^2)^2)^2*b^3$ |

FIG. 9

| MAJOR LOOP ITERATION | MINOR LOOP | COMPONENTS | PARTIAL PRODUCTS |
|---|---|---|---|
| 1 | 1 | $a_1 b_1$<br>$a_1 b_2$<br>$a_1 b_3$<br>$a_1 b_4$ | $c_1 = a_1 b_1 \bmod(2^x)$<br>$c_2 = a_1 b_2 + \text{carry} \bmod(2^x)$<br>$c_3 = a_1 b_3 + \text{carry} \bmod(2^x)$<br>$c_4 = a_1 b_4 + \text{carry} \bmod(2^x)$<br>$c_5 = \text{carry} \bmod(2^x)$ |
|  | 2 | — | $c_1 = a_1 b_2 + \Sigma \bmod(2^x)$<br>$c_2 = a_1 b_3 + \Sigma \bmod(2^x)$<br>$c_3 = a_1 b_4 + \Sigma \bmod(2^x)$<br>$c_4 = \Sigma \bmod(2^x)$<br>$c_5 = \text{carry} \bmod(2^x)$ |
| 2 | 1 | $a_2 b_1$<br>$a_2 b_2$<br>$a_2 b_3$<br>$a_2 b_4$ | $c_1 = a_2 b_1 + a_1 b_2 + \Sigma \bmod(2^x)$<br>$c_2 = a_2 b_2 + a_1 b_3 + \Sigma \bmod(2^x)$<br>$c_3 = a_2 b_3 + a_1 b_4 + \Sigma \bmod(2^x)$<br>$c_4 = a_2 b_4 + \Sigma \bmod(2^x)$<br>$c_5 = \text{carry} + \Sigma \bmod(2^x)$ |
|  | 2 | — | $c_1 = a_2 b_2 + a_1 b_3 + \Sigma \bmod(2^x)$<br>$c_2 = a_2 b_3 + a_1 b_4 + \Sigma \bmod(2^x)$<br>$c_3 = a_2 b_4 + \Sigma \bmod(2^x)$<br>$c_4 = \Sigma \bmod(2^x)$<br>$c_5 = \text{carry} \bmod(2^x)$ |
| 3 | 1 | $a_3 b_1$<br>$a_3 b_2$<br>$a_3 b_3$<br>$a_3 b_4$ | $c_1 = a_3 b_1 + a_2 b_2 + a_1 b_3 + \Sigma \bmod(2^x)$<br>$c_2 = a_3 b_2 + a_2 b_3 + a_1 b_4 + \Sigma \bmod(2^x)$<br>$c_3 = a_3 b_3 + a_2 b_4 + \Sigma \bmod(2^x)$<br>$c_4 = a_3 b_4 + \Sigma \bmod(2^x)$<br>$c_5 = \text{carry} \bmod(2^x)$ |
|  | 2 | — | $c_1 = a_3 b_2 + a_2 b_3 + a_1 b_4 + \Sigma \bmod(2^x)$<br>$c_2 = a_3 b_3 + a_2 b_4 + \Sigma \bmod(2^x)$<br>$c_3 = a_3 b_4 + \Sigma \bmod(2^x)$<br>$c_4 = \Sigma \bmod(2^x)$<br>$c_5 = \text{carry} \bmod(2^x)$ |
| 4 | 1 | $a_4 b_1$<br>$a_4 b_2$<br>$a_4 b_3$<br>$a_4 b_4$ | $c_1 = a_4 b_1 + a_3 b_2 + a_2 b_3 + a_1 b_4 + \Sigma \bmod(2^x)$<br>$c_2 = a_4 b_2 + a_3 b_3 + a_2 b_4 + \Sigma \bmod(2^x)$<br>$c_3 = a_4 b_3 + a_3 b_4 + \Sigma \bmod(2^x)$<br>$c_4 = a_4 b_4 + \Sigma \bmod(2^x)$<br>$c_5 = \text{carry} \bmod(2^x)$ |

HIGH SPEED MONTGOMERY VALUE CALCULATION

CROSS-REFERENCE TO RELATED APPLICATIONS

This application is related to co-pending and commonly assigned application Ser. No. 08/828,368, entitled "High-Speed Modular Exponentiator," by Gregory A. Powell, Mark W. Wilson, Kevin Q. Truong, and Christopher P. Curren, filed Mar. 28, 1997, which application is hereby incorporated by reference herein.

This application is also related to co-pending and commonly assigned application Ser. No. 09/050,379 entitled "Computationally Efficient Modular Multiplication Method and Apparatus," by Matthew S. McGregor and Thuan P. Le, filed on same date herewith, which application is also hereby incorporated by reference herein.

BACKGROUND OF THE INVENTION

1. Field of the Invention

The present invention relates to cryptographic systems, and more particularly, to a method and apparatus for performing high speed computations of a value used in execution of the Montgomery algorithm for an arbitrary modulus size.

2. Description of Related Art

Cryptographic systems are commonly used to restrict unauthorized access to messages communicated over otherwise insecure channels. In general, cryptographic systems use a unique key, such as a series of numbers, to control an algorithm used to encrypt a message before it is transmitted over an insecure communication channel to a receiver. The receiver must have access to the same key in order to decode the encrypted message. Thus, it is essential that the key be communicated in advance by the sender to the receiver over a secure channel in order to maintain the security of the cryptographic system; however, secure communication of the key is hampered by the unavailability and expense of secure communication channels. Moreover, the spontaneity of most business communications is impeded by the need to communicate the key in advance.

In view of the difficulty and inconvenience of communicating the key over a secure channel, so-called public key cryptographic systems are proposed in which a key may be communicated over an insecure channel without jeopardizing the security of the system. A public key cryptographic system utilizes a pair of keys in which one is publicly communicated, i.e., the public key, and the other is kept secret by the receiver, i.e., the private key. While the private key is mathematically related to the public key, it is practically impossible to derive the private key from the public key alone. In this way, the public key is used to encrypt a message, and the private key is used to decrypt the message.

Such cryptographic systems often require computation of modular exponentiations. As a representative example, consider an exponentiation of the form $y = b^e \bmod n$, in which the base b, exponent e and modulus n are extremely large numbers, e.g., having a length of 1,024 binary digits or bits. If, for example, the exponent e were transmitted as a public key, and the base b and modulus n were known to the receiver in advance, a private key y could be derived by computing the modular exponentiation. It would require such a extremely large amount of computing power and time to factor the private key y from the exponent e without knowledge of the base b and modulus n, that unauthorized access to the decrypted message is virtually precluded as a practical matter.

A drawback of such cryptographic systems is that calculation of the modular exponentiation remains a daunting mathematical task even to an authorized receiver using a high speed computer. With the prevalence of public computer networks used to transmit confidential data for personal, business and governmental purposes, it is anticipated that most computer users will want cryptographic systems to control access to their data. Despite the increased security, the difficulty of the modular exponentiation calculation will substantially drain computer resources and degrade data throughput rates, and thus represents a major impediment to the widespread adoption of commercial cryptographic systems.

One technique in reducing the computations required to perform cryptographic evaluations is to use an algorithm postulated by P. L. Montgomery in "Modular Multiplication without Trial Division," published in the Mathematics of Computation, vol. 48, n. 177, January 1987, pp. 243–264, which is hereby incorporated by reference herein. This algorithm is known as "Montgomery's Method." To perform this algorithm, a Montgomery value defined as $2^{2k} \bmod(n)$ must be computed, where n is the modulus, k is the number of bits representing the n modulus, and the expression A mod(n) denotes the modular reduction of A by n.

One of the more computationally intense calculations performed in determining the Montgomery value is the computation of $2^{k+1} \bmod(n)$, or the modular reduction of $2^{k+1}$ by n. The number of subtractions required to complete the reduction are a function of both the modulus n and the operand size of the processor, and hence, for a given value of modulus n, a processor size of suitable operand size to reduce the number of required computations can be selected. Unfortunately, cryptographic systems usually require modular reduction capability for arbitrary modulus values, and processors with fixed operand sizes are poorly suited to efficiently compute $2^{k+1} \bmod(n)$ in such cases.

As is apparent from the above, there is a need in the cryptographic art for an apparatus and method for performing modular reductions and for determining the value of $2^{2k} \bmod(n)$ for arbitrary modulus sizes in conjunction with fixed processor operand capacities. The present invention satisfies that need.

SUMMARY OF THE INVENTION

In accordance with the teachings of the present invention, a method and apparatus for performing high-speed computations of a Montgomery value is provided.

The method begins by configuring a first register such that there is a one in the $2^{(h*m)+1}$ bit position of the first register and a zero in all less significant registers in the register, where m is a processor operand size and b is the smallest integer such that the product (h*m) is not less than k. Then, k bits representing the value of the modulus n are loaded into a second register and shifted in the most significant bit direction until the most significant non-zero bit of n is at the (h*m)−1 bit position. This shifts the most significant bit of modulus n in such a way as to assure that the subtractive operations which follow are reduced.

Next, the value in the second register (representing the modulus n) is repeatedly subtracted from the first register (which contains $2^{(h*m)+1}$) until the value of the first register is less than the value of the modulus n. At the end of this step, the value of $2^{(h*m)+1} \bmod(n)$ is in the first register. Then, this value is repeatedly squared $\log_2(k)$ times, yielding $2^{2k} \bmod(n)$.

The apparatus comprises a processor for accepting and performing operations on an m-bit operand where m is an integer greater than one, a first register for storing a number representing $2^{(h*m)+1}$, and a second register including a first integer multiple of m bit positions. The second register is configured to store an arbitrary modulus n such that the most significant non-zero bit of the modulus n is at a bit position defined by a second integer multiple of m. In one embodiment, the foregoing bit configuration of n in the second register is provided by bit shifting the modulus n a suitable number of times.

BRIEF DESCRIPTION OF THE DRAWINGS

FIG. 4 is a flow chart showing an exponent bit scanning operation performed by the modular exponentiator;

FIG. 9 is a chart showing an exemplary multiplication and squaring operation in accordance with the flow charts of FIGS. 6 and 7.

DETAILED DESCRIPTION OF THE PREFERRED EMBODIMENT

The present invention satisfies the need for a high speed modular exponentiation method and apparatus which provides a sufficient level of communication security while minimizing the impact to computer system performance and data throughput rates. In the detailed description that follows, like element numerals are used to describe like elements in one or more of the figures.

Figure 1:
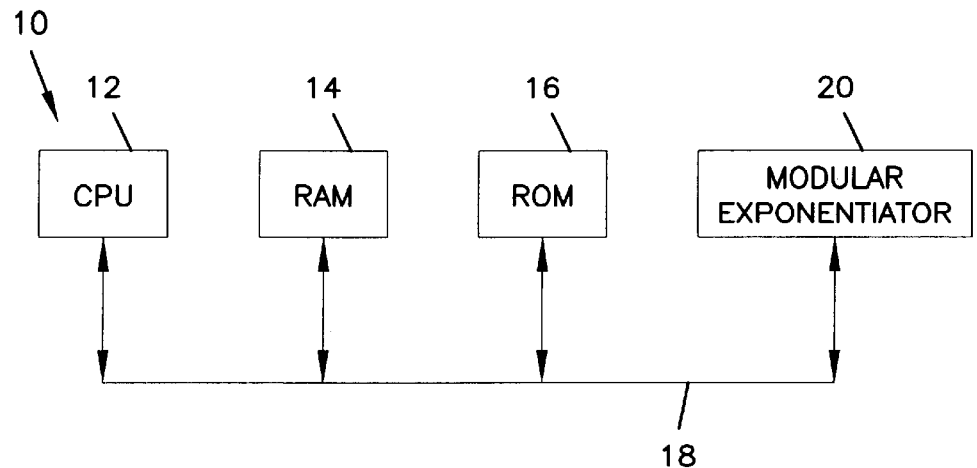
FIG. 1 is a block diagram of an exemplary application of a modular exponentiator within a cryptographic system.

Referring first to FIG. 1, a block diagram of an application of a modular exponentiator 20 within an exemplary cryptographic system 10 is illustrated. The exemplary cryptographic system 10 includes a central processing unit (CPU) 12, a random access memory (RAM) 14, a read only memory (ROM) 16, and modular exponentiator 20. Each of the elements of the cryptographic system 10 are coupled together by a bi-directional data and control bus 18, over which data and control messages are transmitted. The CPU 12 controls the operation of the cryptographic system 10, and may be provided by a conventional microprocessor or digital signal processor circuit. The RAM 14 provides temporary data storage for operation of the CPU 12, and the ROM 16 provides for non-volatile storage of an instruction set, i.e., software, that is executed in a sequential manner by the CPU 12 to control the overall operation of the cryptographic system 10. The modular exponentiator 20 may comprise a special function device, such as an application specific integrated circuit (ASIC) or field programmable gate array (FPGA), that is accessed by the CPU 12 to perform modular exponentiation operations. Alternatively, the elements of the cryptographic system 10 may all be contained within a single ASIC or FPGA in which the modular exponentiator 20 is provided as an embedded core process.

As known in the art, the cryptographic system provides an interface between a non-secure communication channel and a data user. The cryptographic system receives encrypted data from an external source, such as a remote transmitter (not shown) which is communicating with the cryptographic system over the communication channel. The encrypted data is decrypted by the cryptographic system, and the decrypted data is provided to the data user. Conversely, the data user provides decrypted data to the cryptographic system for encryption and subsequent transmission across the communication channel. The cryptographic system also receives and transmits various non-encrypted messages, such as control data and the public key information. It should be apparent that all communications with the cryptographic system occur via the data and control bus 18.

Figure 2:
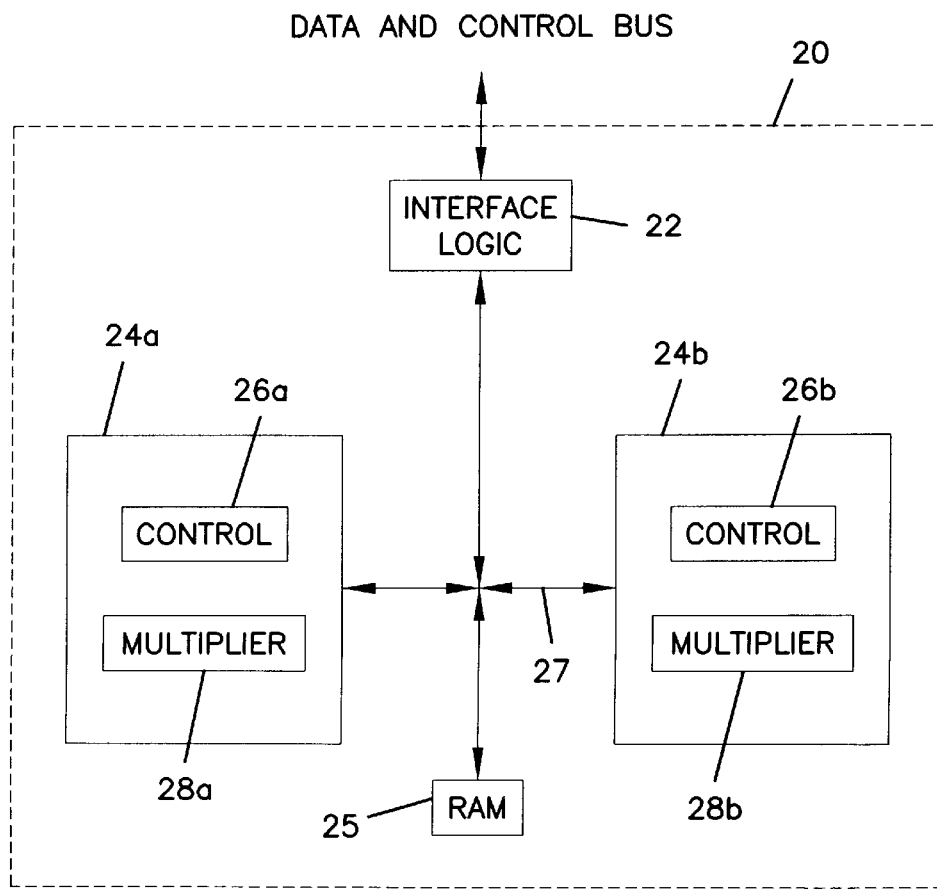
FIG. 2 is a block diagram of the modular exponentiator.

The modular exponentiator 20 is illustrated in greater detail in FIG. 2. The modular exponentiator 20 comprises an interface logic unit 22, a pair of parallel processing units 24a, 24b, and a RAM 25, which all communicate internally over a data and control bus 27. The interface logic unit 22 controls communications between the modular exponentiator 20 and the data and control bus 18 of the cryptographic system 10 described above. The processing units 24a, 24b comprise respective control units 26a, 26b and multiplier units 28a, 28b, which further comprise internal circuit elements that execute a modular exponentiation process, as will be further described below. The RAM 25 provides for temporary storage of data values generated by the control units 26a, 26b and multiplier units 28a, 28b while executing a modular exponentiation operation.

Figure 3:
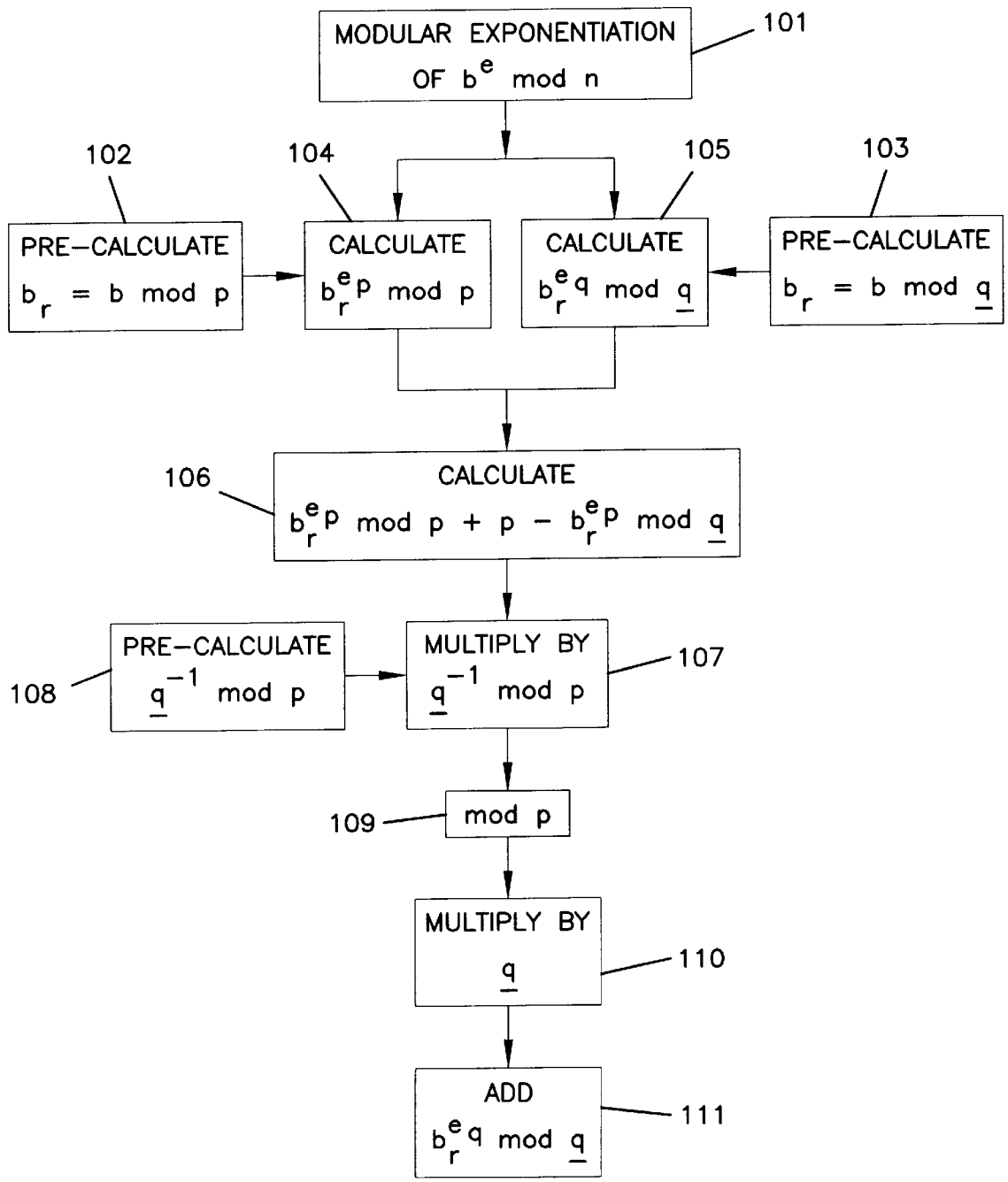
FIG. 3 is a system level flow diagram of the functions performed by the modular exponentiator.

Referring now to FIG. 3 in conjunction with FIG. 2 described above, a system level flow diagram of the functions performed by the modular exponentiator 20 is illustrated. As shown at step 101, the modular exponentiator 20 will compute a modular exponentiation of the form $y=b^e$ mod n, in which the modulus n, base b and exponent e are each k bits long. In a preferred embodiment of the present invention, k is 1,024 bits. Using conventional methods, solving such a modular exponentiation would require a tremendous amount of computing power due to the large number and size of the multiplications and modular reductions that must be performed. In the present invention, the modular exponentiation is solved in a highly efficient manner by reducing the size of the problem and by reducing the number of multiplications that are performed.

As a first step in solving the modular exponentiation, the original exponentiation is split into components, as follows:

$$b^e \bmod n = (((q^{-1} \bmod p * (b_r{}^{e_p} \bmod p + p - b_r{}^{e_q} \bmod q)) \bmod p) * q) + b_r{}^{e_q} \bmod q$$

in which p and q are large prime numbers whereby n=p*q. For maximum security, p and q should be roughly the same size. The term $q^{-1}$ mod p is a special value called an inverse which is derived from the Chinese remainder theorem, as known in the art. In particular, $q^{-1}$ mod p is the inverse of q mod p. Since the inverse represents a modular exponentiation of the same order as $b^{e_p}$ mod p, the inverse may be pre-calculated in advance, and stored in the RAM 25 at step 108. The values $e_p$ and $e_q$ are k/2 bit values equal to e mod (p−1) and e mod (q−1), respectively. A reduced base term $b_r$ for each of $b_r^{e_p}$ mod p and $b_r^{e_q}$ mod q is provided by taking a modular reduction of b with respect to p and q, respectively. The reduced base terms $b_r$ thus have a k/2 bit length as well.

Splitting the modular exponentiation permits its solution in two parallel paths, as illustrated in FIG. 3, which are processed separately by the respective processing units 24a, 24b of FIG. 2. At steps 104, 105, the modular exponentiations $b_r^{e_p}$ mod p and $b_r^{e_q}$ mod q are calculated separately using techniques that will be further described below. The $b_r$ terms of each of the two modular exponentiations may be pre-calculated in advance, and stored in the RAM 25 at steps 102, 103.

Since p and q are each respectively k/2 bits in length, the magnitude of the respective problems is thus reduced substantially from its original form. Moreover, the parallel calculation of two reduced-size modular exponentiations requires substantially less computer processing time than a corresponding calculation of the original modular exponentiation within a single processing unit. The reduction in processing time results from the fact that the number of multiplies needed to perform an exponentiation with an efficient algorithm (such as described below) is proportional to $2s^2+s$, where s is equal to k divided by the multiplication operand size in bits. If an s word problem was treated as two separate s/2 word problems, the number of multiply operations per exponentiation is reduced to a value proportional to $$\frac{s^2}{2} + \frac{s}{2}.$$

For example, if k were 1,024 bits and the multiplication operand were 128 bits, s would be equal to 8. Accordingly, an s word problem would require a number of multiply operations proportional to 136, while the two separate s/2 word problems would respectively require a number of multiply operations proportional to 36. Thus, the number of multiply operations is reduced by 3.778 times.

The computation of $b_r=b$ mod p can be performed by calculating a Euclidean inverse and applying the Montgomery algorithm as described in the paper "Analyzing and Comparing Montgomery Multiplication Algorithms," by Cetin Kaya Coc et al, published in IEEE Micro in June 1996, which is hereby incorporated by reference herein. Part of this computation requires the calculation of $2^{2k}$ mod(n) for an arbitrary n. A computationally efficient method for performing this calculation is discussed later in this disclosure with respect to FIGS. 9 and 10.

Following the calculations of steps 104, 105, the $b_r^{e_p}$ mod q term is subtracted from $b_r^{e_p}$ mod p and the result is added to p at step 106. At step 107, the resulting sum is multiplied by the inverse $q^{-1}$ mod p which was pre-calculated at step 108. This step may be performed by one of the multipliers 28a, 28b, which are optimized for modular operations as will be further described below. The resulting product is modularly reduced with respect to p at step 109, and further multiplied by q at step 110 to produce a k-bit value. Lastly, the product of that final multiplication is added to $b_r^{e_q}$ mod q at step 111, which was previously calculated at step 105. It should be appreciated that the modular reduction that occurs at step 109 is much easier than the original modular exponentiation in view of the substantial reduction in size of the original be term. This final solution to the modular exponentiation is provided to the data and control bus 18 for further use by the CPU 12.

Referring now to FIGS. 4 and 5a–c, the modular exponentiations of $b_r^{e_p}$ mod p and $b_r^{e_q}$ mod q from steps 104, 105 of FIG. 3 are shown in greater detail. Specifically, FIG. 4 illustrates a flow chart describing a routine referred to herein as exponent bit-scanning, which is used to reduce the number of multiplications necessary to perform an exponentiation. In general, the exponent bit-scanning routine factors the exponentials $b_r^{e_p}$ and $b_r^{e_q}$ into a product of precomputed powers of the reduced base b, modularly reduced with respect to p or q. The routine may be coded in firmware and executed sequentially by the respective processing units 24a, 24b described above in the form of a software program. Alternatively, the routine may be hardwired as discrete logic circuits that are optimized to perform the various functions of the exponent bit-scanning routine. For convenience, the description that follows will refer only to the operation of the exponent bit scanning routine with respect to the exponential $b_r^{e_p}$, but it should be appreciated that a similar operation must be performed with respect to the exponential $b_r^{e_q}$.

Figure 5A:
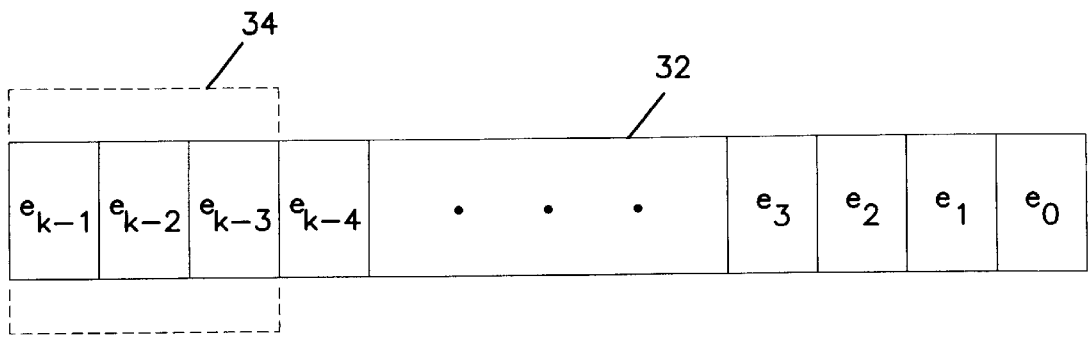
FIG. 5a–c are block diagrams of an exponent register within various stages of the exponent bit scanning operation of FIG. 4.
Figure 5B:
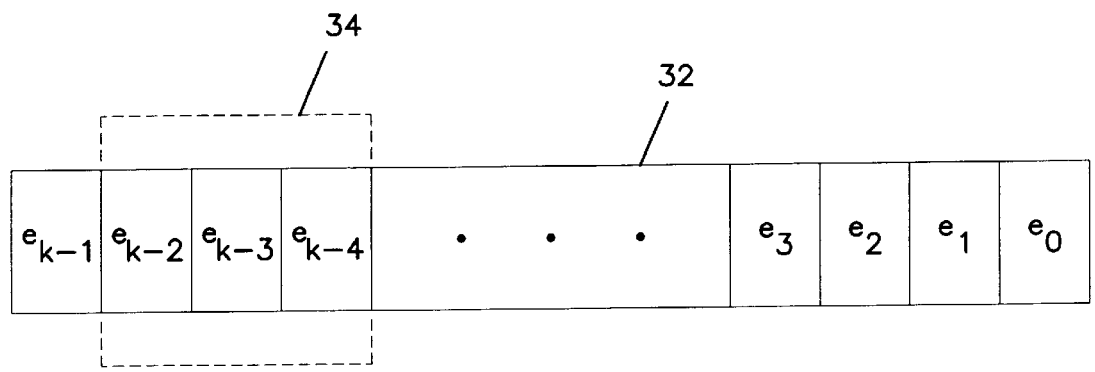
Figure 5C:
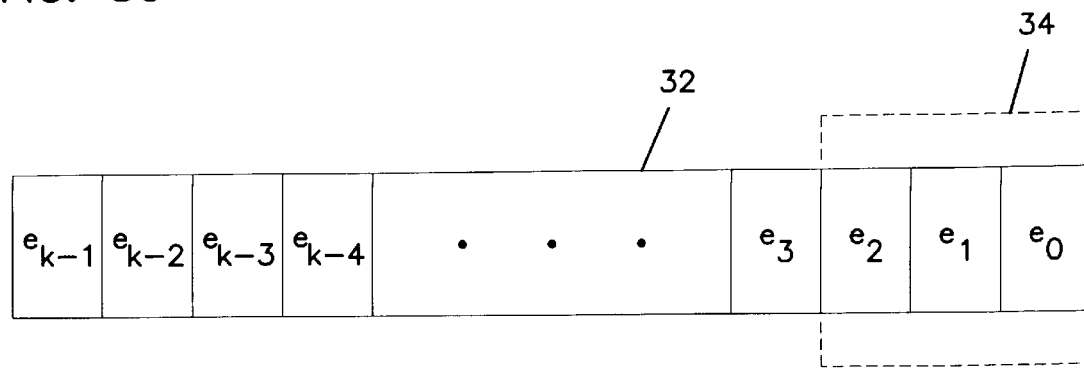

The exponent bit-scanning routine is called at step 200, and a running total is initialized to one at step 201. An exponent $e_p$ to be bit-scanned is loaded into a register at step 202. FIGS. 5a–c illustrate a k-bit exponent e (i.e., $e_{k-1}-e_0$) loaded into a register 32. The register 32 may comprise a predefined memory space within the RAM 25. First, a window 34 is defined through which a limited number of bits of the exponent e are accessed. A window size of three bits is used in an exemplary embodiment of the present invention, though it should be appreciated that a different number could also be advantageously utilized. The window 34 is shifted from the left of the register 32 until a one appears in the most significant bit (MSB) of the 3-bit window, as shown by a loop defined at steps 203 and 204. In step 203, the MSB is checked for presence of a one, and if a one is not detected, the window 34 is shifted by one bit to the right at step 204. FIG. 5b illustrates the window 34 shifted one bit to the right. It should be apparent that steps 203 and 204 will be repeated until a one is detected.

At step 205, a one has been detected a the MSB, and the value of the three-bit binary number in the window 34 is a read. The number is necessarily a 4, 5, 6 or 7 (i.e., binary 100, 101, 110 or 111, respectively) since the MSB is one. At step 206, a pre-computed value for the reduced base $b_r$ raised to the number read from the window 34 (i.e., $b_r^4$, $b_r^5$, $b_r^6$ or $b_r^7$, respectively) is fetched from memory. This pre-computed value is multiplied by a running total of the exponentiation at step 207. It should be appreciated that in the first pass through the routine the running total is set to one as a default.

Thereafter, a loop begins at step 209 in which the register 32 is checked to see if the least significant bit (LSB) of the exponent $e_p$ has entered the window 34. Significantly, step 209 checks for the LSB of the entire exponent $e_p$, in contrast with step 203 which reads the MSB of the window 34. If the LSB has not yet entered the window 34, the loop continues to step 212 at which the window 34 is successively shifted to the right, and step 213 in which the running total is modular squared with each such shift. The loop is repeated three times until the previous three bits are no longer in the window 34, i.e., three shifts of the window. Once three shifts have occurred, the routing determines at step 216 whether the MSB is one. If so, the routine returns to step 205, and the value in the window 34 is read once again. Alternatively, if the MSB is zero, then the register 32 is again checked at step 217 to see if the LSB of the exponent $e_p$ has entered the window 34. If the LSB is not in the window 34, the loop including steps 212 and 213 is again repeated with the window again shifted one bit to the right and the running total modular squared with the shift.

If, at step 217, the LSB has entered the window 34, this indicates that the end of the exponent $e_p$ has been reached and the exponent bit-scanning routine is almost completed. At step 222, the last two bits in the window 34 are read, and at step 223 the running total is multiplied by the reduced base $b_r$ the number of times the value read in the window. For example, if the value of the lower two bits is a one, two, or three (i.e., binary 01, 10 or 11, respectively), then the previous running total is multiplied by the reduced base $b_r$ one, two or three times, respectively. If the value of the lower two bits is a 0, then the running total is not changed (i.e., multiplied by one). Then, the exponent bit-scanning routine ends at step 224.

Returning to step 209 discussed above, before the loop begins, the register 32 is checked to see if the LSB of the exponent $e_p$ has entered the window 34. If the LSB has entered the window 34, a series of step are performed in which the count value is checked. The count value keeps track of the number of passes through the above-described loop that have taken place. If the count value is three, indicating that all of the bits in the window 34 have been previously scanned, then the exponent bit-scanning routine ends at step 224. If the count value is two, then all but the last bit in the window 34 has been previously scanned, and at step 221, the value of the last bit is read. If the count value is one, then only the first bit in the window 34 has been previously scanned, and at step 222, the value of the last two bits is read (as already described above). Once again, at step 223 the running total is multiplied by the reduced base $b_r$ the number of times the value read in the window. Then, the exponent bit-scanning routine ends at step 224.

Figures 7, 8:
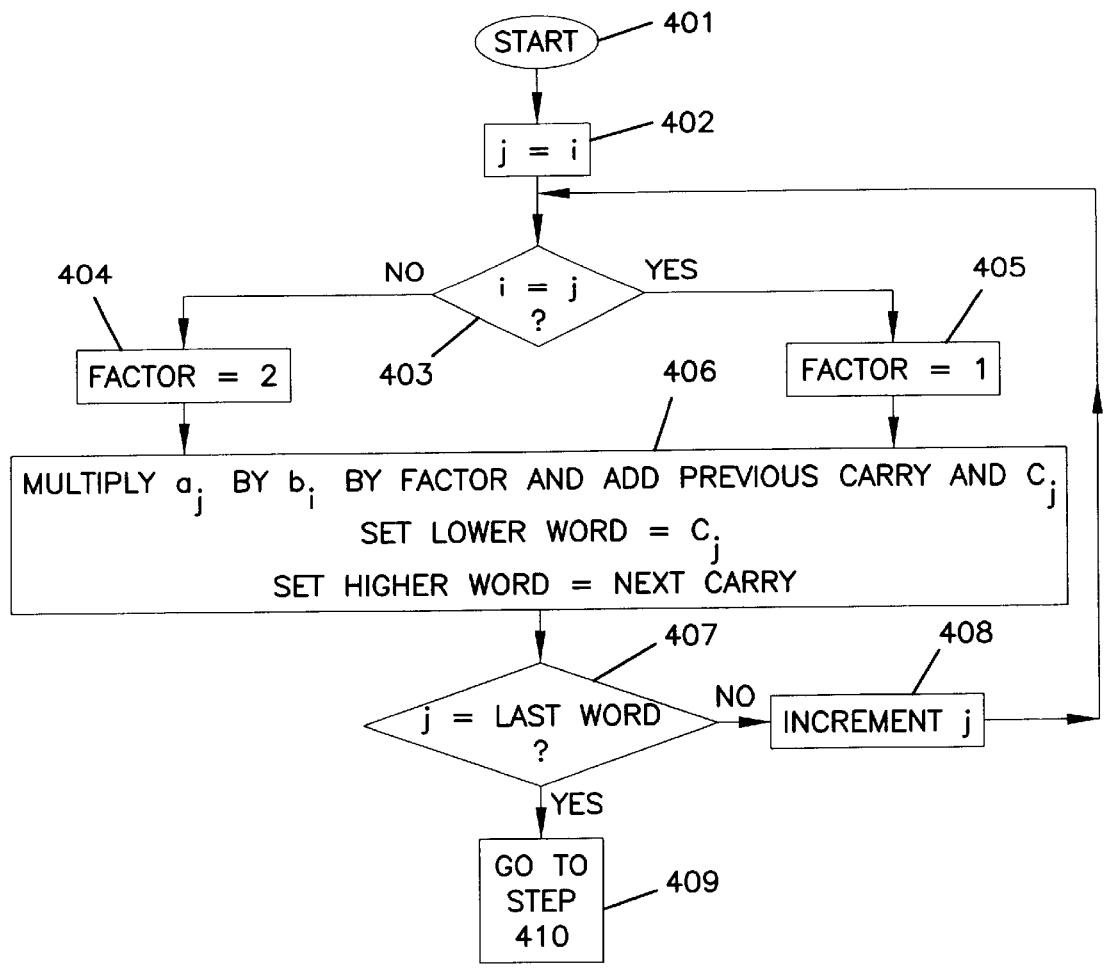
FIG. 7 is a flow chart showing a squaring operation performed in conjunction with the multiplication operation of FIG. 6.
FIG. 8 is a chart showing an exemplary exponent bit scanning operation in accordance with the flow chart of FIG. 4.

An example of the exponent bit-scanning technique is illustrated in FIG. 8 with respect to a modular exponentiation of a base b raised to a ten-bit exponent e, in which e=1011010011. The successive shifts reduce the exemplary term $b^{1011010011}$ to $((((((b^5)^2)^2)^2*b^5)^2)^2)^2*b^3$. Since the term $b^5$ was precalculated and fetched from memory, processing time is saved by not having to calculate that term. In addition, there are additional processing time savings that are achieved in performing a modular reduction of the exemplary term with respect to n due to the distributive nature of modular reduction. Rather than a huge number of multiplications followed by an equally huge modular reduction, only nine multiplications and modular reductions are required, and the modular reductions are smaller in magnitude since the intermediate values are smaller.

It should be appreciated that the modular squaring step that occurs with each shift is necessary since the exponent bit-scanning begins at the MSB of the exponent $e_p$ where the window value is not really 4, 5, 6 or 7, but is actually 4, 5, 6 or 7 times $2^k$ where k is the exponent bit position for the window's LSB bit. Since the value of the exponent $e_p$ is interpreted as a power of the base $b_r$, a factor of $2^k$ implies squaring k times. Multiplying by a precalculated value when the window MSB is one is used to insure that all ones in the exponent $e_p$ are taken into account and to reduce the total number of pre-calculated values that are needed.

Even though the exponent bit-scanning routine has reduced the number of multiplications that have to be performed in the respective calculations of $b_r^{e_p}$ mod p and $b_r^{e_q}$ mod q, there still are a number of multiplications that need to be performed. The modular exponentiator 20 utilizes an efficient multiplication algorithm for modular terms, referred to in the art as Montgomery multiplication. The Montgomery algorithm provides that:

$$\text{Mont}(a, b) = \frac{(a*b)}{2^k} \bmod n$$

where k is the number of bits in the modulus n, n is relatively prime to $2^k$, and n>a, n>b. In order to use the algorithm for repeated multiplies, the values of a and b must be put into Montgomery form prior to performing the Montgomery multiply, where:

$$x*2^k \bmod n = x_{MONT}$$

If the two values to the Montgomery multiplied are in Montgomery form, then the result will also be in Montgomery form.

Figure 6:
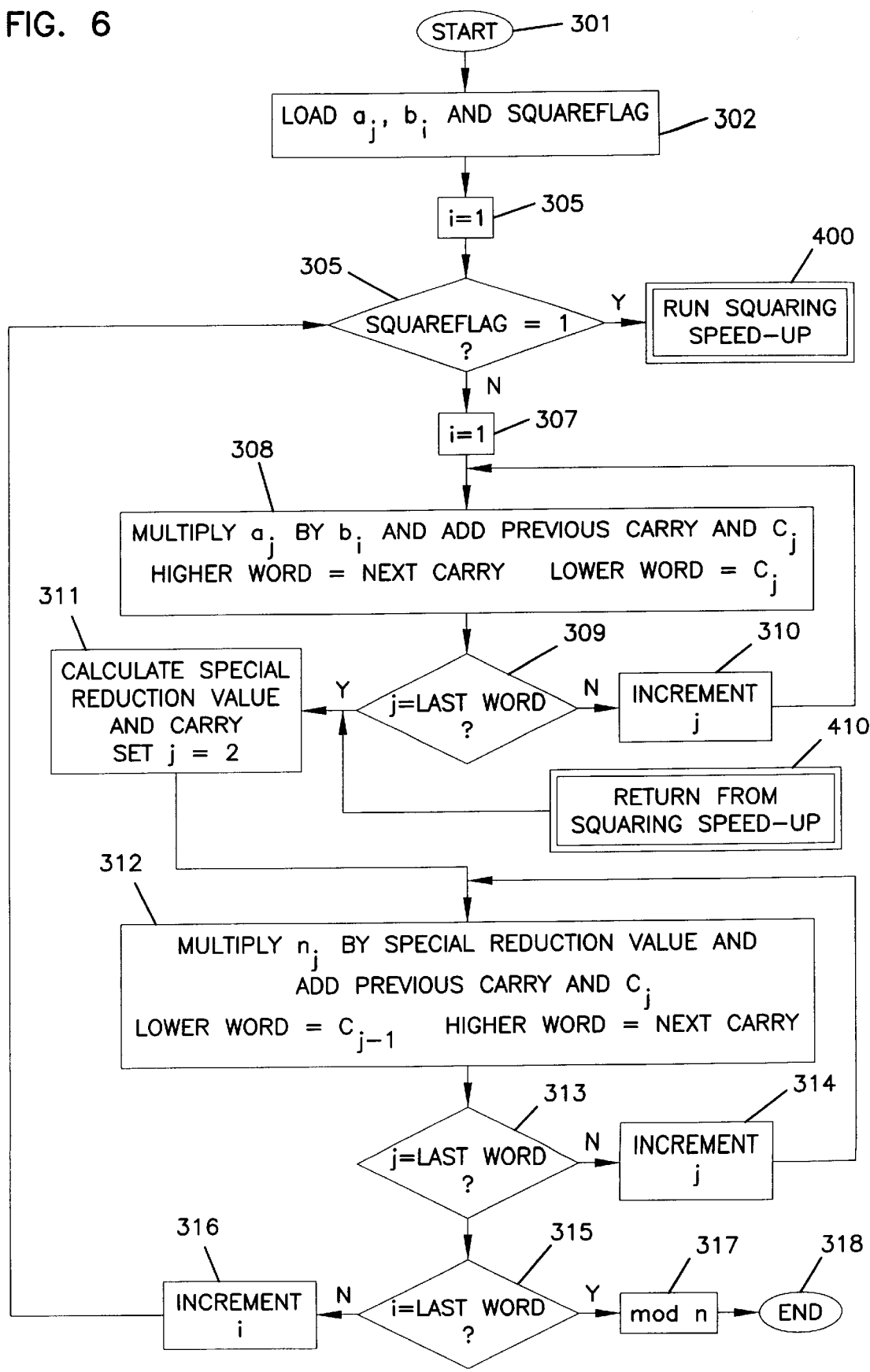
FIG. 6 is a flow chart showing a multiplication operation performed by the modular exponentiator.

FIG. 6 illustrates a flow chart describing a Montgomery multiplication operation executed by the modular exponentiator 20. As with the exponent bit-scanning routine described above with respect to FIG. 4, the Montgomery multiplication operation may be coded in firmware and executed sequentially within the respective processing units 24a, 24b by the control units 26a, 26b which access the multipliers 28a, 28b for particular aspects of the operation, as will be further described below. Alternatively, the Montgomery multiplication routine may be hardwired as discrete logic circuits that are optimized to perform the various functions of the routine.

As illustrated in FIG. 6, the Montgomery multiplication routine includes a major loop and two minor loops. In each major loop, a distinct word of a multiplicand $b_i$ is multiplied by each of the words of a multiplicand $a_j$, where j is the number of words in multiplicand $a_j$ and i is the number of words in multiplicand $b_i$. The Montgomery multiplication routine is called at step 301. The two multiplicands $a_j$ and $b_i$ are loaded into respective registers at step 302, along with a square flag. If the two multiplicands $a_j$ and $b_i$ are equal, the square flag is set to one so that a squaring speed-up subroutine may be called at step 400. The squaring speed-up subroutine will be described in greater detail below. If the two multiplicands $a_j$ and $b_i$ are not equal, then the square flag is set to zero.

Before initiating the first major loop, i is set to be equal to one at step 305 so that the first word of multiplicand $b_i$ is accessed. The square flag is checked at step 306 to determine whether the squaring speed-up subroutine should be called, and if not, j is set equal to one at step 307. The two words $a_j$ and $b_i$ are multiplied together within the first minor loop at step 308, and the product added to the previous carry and previous $c_j$. It should be appreciated that in the first pass through the routine, the carry and $c_j$ values are zero. The lower word of the result is stored as $c_j$ and the higher word of the result is used as the next carry. The first minor loop is repeated by incrementing j at step 310 until the last word of $a_j$ is detected at step 309, which ends the first minor loop. Before starting the second minor loop, a special reduction value is calculated that produces all "0"s for the lowest word of $c_j$ when multiplied with $c_j$, and j is set to two at step 311. Thereafter, at step 312, the special reduction value is multiplied by the modulus $n_j$, added to the previous carry and $c_j$. The lower word of the result is stored as $c_{j-1}$ and the higher word of the result is used as the next carry. The second minor loop is repeated by incrementing j at step 314 until the last word of $c_j$ is detected at step 313, which ends the second minor loop. Once the second minor loop ends, i is incremented at step 316 and the major loop is repeated until the last word of $b_i$ has passed through the major loop. Then, the modular reduction of the final result of $c_j$ with respect to n is obtained at step 317, and the Montgomery multiplication routine ends at step 318. An example of a Montgomery multiplication of $a_j$ with $b_i$ in which both multiplicands are four words long is provided at FIG. 9. In the example, the symbol 7 is used to denote the combination of all previous values.

The Montgomery multiplication routine of FIG. 6 can be speeded up when used to square a number by recognizing that some of the partial products of the multiplication are equal. In particular, when multiplicand $a_j$ is equal to multiplicand $b_i$, i.e., a squaring operation, then the partial products of various components of the multiplication would ordinarily be repeated, e.g., the partial product of $a_2$ with $b_3$ is equal to the partial product of $a_3$ with $b_2$. As illustrated in FIG. 9, both of these partial products occur during the third major loop iteration. Thus, the first time the partial product is encountered it can be multiplied by two to account for the second occurrence, and a full multiplication of the second partial product can be skipped. Multiplication by two constitutes a single left shift for a binary number, and is significantly faster than a full multiplication operation. It should be appreciated that a great number of squaring operations are performed by the modular exponentiator 20 due to the operation of the exponent bit-scanning routine described above, and an increase in speed of the squaring operations would have a significant effect on the overall processing time for a particular modular exponentiation.

FIG. 7 illustrates a flow chart describing the squaring speed-up subroutine, which is called at step 401. Initially, j is set to be equal to i at step 402, which, in the first iteration of the major loop of FIG. 6, will be equal to one. In subsequent iterations of the major loop, however, it should be apparent that j will begin with the latest value of i and will thus skip formation of partial products that have already been encountered. At step 403, i is compared to j. If i is equal to j, then at step 405 a factor is set to one, and if i and j are not equal, then at step 404 the factor is set to two. Thereafter, in step 406, $a_j$ and $b_i$ and the factor are multiplied together the product added to the previous carry and $c_j$. As in step 308 of FIG. 6, the lower word of the result is stored as $c_j$ and the higher word of the result is used as the next carry. After completing the multiplication step 406, j is incremented at step 408 and the loop is repeated until the last word of $b_j$ has passed through the loop, at which time the squaring speed-up subroutine ends at step 409. At step 410 of FIG. 6, the Montgomery multiplication routine resumes just after the first minor loop. It should be appreciated that the squaring speed-up subroutine will operate in place of the first minor loop for every iteration of the major loop of the Montgomery multiplication routine when the squaring flag is set.

In order to perform the Montgomery multiplication routine more efficiently, the multipliers 28a, 28b are tailored to perform specific operations. In particular, the multipliers 28a, 28b include specific functions for multiplying by two (used by the squaring speed-up routine), executing an a*b+c function, and performing the mod $2^n$ function on a 2n-bit result while leaving the higher n bits in a carry register.

The computations performed in blocks 102 and 103 of FIG. 3 require the calculation of $2^{2^k}$ mod(n), where n is a modulus value, and k is the number of bits used to represent modulus n. The value of $2^{2^k}$ mod (n) can be determined by finding the value of $2^{k+1}$ mod(n), and then repeatedly squaring this result $\log_2(k)$ times. This is possible because in the Montgomery form, $(a*b)=[(a*b)/2^k]$mod (n), and hence $$[2^{k+1}\mathrm{mod}(n)*2^{k+1}\mathrm{mod}(n)]=[(2^{k+1}*2^{k+1})/2^k]=2^{k+2}\mathrm{mod}(n)$$

For purposes of example, Table 1 shows the computation of $2^{2^k}$ mod(n) for k=512 bits. As shown, $\log_2(512)=9$ modular squaring operations are required to complete the computation.

TABLE 1

| Input | Operation | Result |
|---|---|---|
| $2^{k+1}$ | Modular Reduction by n | $2^{k+1}$ mod(n) |
| $2^{k+1}$ mod(n) | Modular Square | $2^{k+2}$ mod(n) |
| $2^{k+2}$ mod(n) | Modular Square | $2^{k+4}$ mod(n) |
| $2^{k+4}$ mod(n) | Modular Square | $2^{k+8}$ mod(n) |
| $2^{k+8}$ mod(n) | Modular Square | $2^{k+16}$ mod(n) |
| $2^{k+16}$ mod(n) | Modular Square | $2^{k+32}$ mod(n) |
| $2^{k+32}$ mod(n) | Modular Square | $2^{k+64}$ mod(n) |
| $2^{k+64}$ mod(n) | Modular Square | $2^{k+128}$ mod(n) |
| $2^{k+128}$ mod(n) | Modular Square | $2^{k+256}$ mod(n) |
| $2^{k+256}$ mod(n) | Modular Square | $2^{k+512}$ mod(n) |

Since modular squaring operations are relatively simple and straightforward, most of the computations involved in determining $2^{2^k}$ mod (n) are involved in the modular reduction of $2^{k+1}$ by n. A direct way of performing this modular reduction is to repeatedly subtract the modulus n from $2^{k+1}$ until the remainder is less than the modulus n. Typically, these operations are performed m bits at a time by a processor such as multiplier 28a,b with a given fixed operand size of m bits, where m is a positive integer greater than one. If the most significant non-zero bit of the modulus n resides in the most significant bit position of the processor operand, this computation will require at most four subtractions.

If the modulus size is not an integer multiple of the multiplier operand size, a new $2^{k+1}$ value would need to be created to keep the number of subtraction operations to a maximum of four. Ordinarily, this would require the controller to compute a new $2^{k+1}$ value for every modulus size. To reduce the complexity of the controller needed to create a new $2^{k+1}$ value for every modulus size, one embodiment of the present invention instead creates the value $2^{(h*m)+1}$ where m is the number of bits in the multiplier slice and h is an integer greater than or equal to one.

When the modulus size is an integer multiple of the multiplier slice size, k=(h*m) and hence $2^{(h*m)+1}$ is equivalent to $2^{k+1}$. If this restriction on the value of $2^{k+1}$ is made, then $2^{k+1}$ mod(n) can be calculated by MSB justifying n in an (h*m) bit field such that the shifted value of n is k significant bits followed by zeroes making a new (h*m)-bit modulus. The resultant reduction of $2^{(h*m)+1}$ by the shifted n therefore requires at most four subtractions, as before. This method further facilitates calculation of the Montgomery value because moduli of arbitrary sizes can be treated as m-bit blocks and processed in a straightforward fashion.

Figure 10:
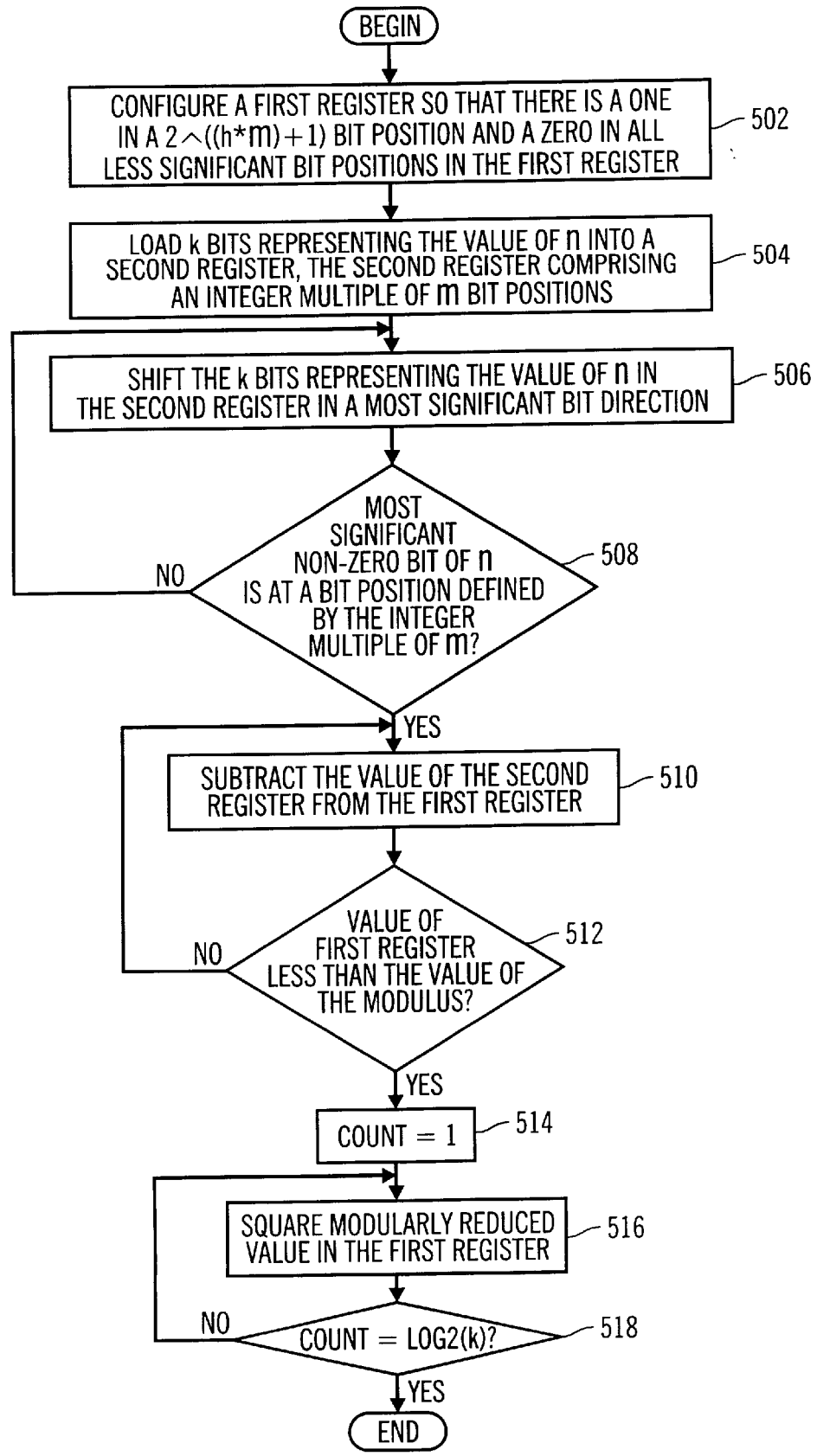
FIGS. 10 and 11 depict the operations performed in the high speed Montgomery Value calculation.
Figure 11:
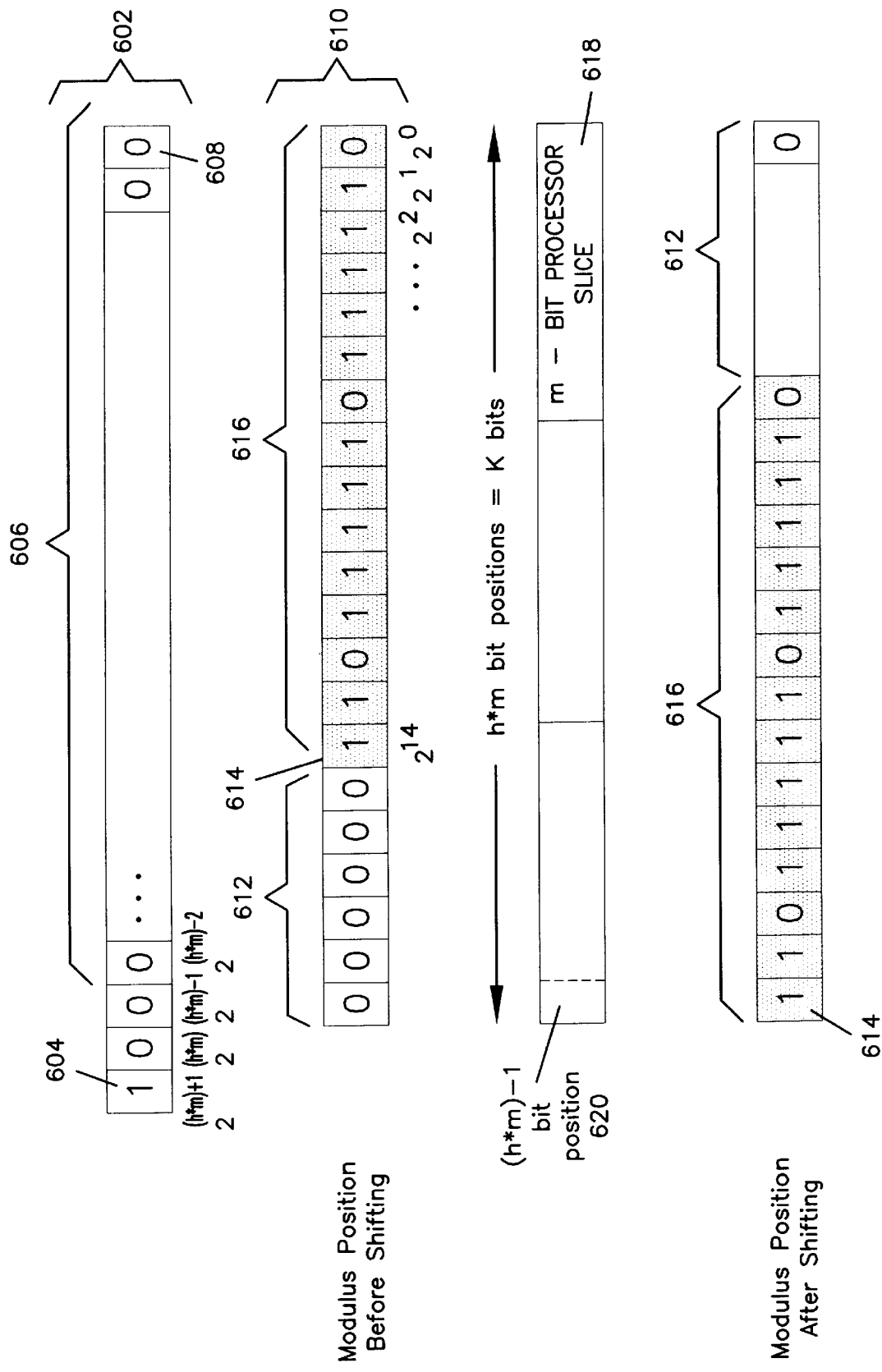

FIGS. 10 and 11 depict the operations discussed above. These operations allow a fixed processor such as multipliers 28a,b which accept a fixed operand size of m bits to determine the value of $2^{2^k}$ mod(n), where n is an arbitrary modulus value, and k is the number of bits used to represent modulus n. The process begins by entering a value of $2^{(h*m)+1}$ in a first register 602. This process is depicted in FIG. 11 as block 502, and the resulting data structure is shown in FIG. 10 as first register 602. The first register 602 may be configured with a "1" in the $2^{(h*m)+1}$th bit position 604 and zeros in all less significant bit positions 606 in several ways. One method is to clear the first register 602 and then enter a 1 into the $2^{(h*m)+1}$th bit position 604. An alternative method is to enter a 1 into the $2^{0 \ th}$ bit position 608 and then to shift that bit left the appropriate amount while adding a series of LSB zeros. In either case, the $2^{(h*m)+1}$th bit position is determined from the relation that the product (h*m) be not less than the value of k. Values of h satisfying this relation can be determined because m (the operand size of the multiplier in bits) and k (the number of bits in the modulus) are known.

The k bits representing the modulus n are then loaded into a second register 610. This is depicted in block 504. The second register 610 comprises a number of bit positions that will generally exceed that which are required to represent modulus n. Accordingly, for an arbitrary value of modulus n, the k bits will generally include a series of leading bits in the more significant bit positions 612 which have a value of zero (hereinafter "zero bits"). The remaining bits include a most significant non-zero bit 614 of the modulus n, followed by bits which could be either ones or zeros (hereinafter "non-zero bits").

As described above, if the modulus non-zero bits 616 are represented as an integer multiple of m (that is, the most significant non-zero bit 614 is in the (h*m)−1 position) the modular reduction can be completed in at most four subtraction operations. If not, the number of operations required can be much greater. To reduce the number of operations required, the non-zero bits 616 in the second register 610 are shifted in the most significant bit direction, until the most significant non-zero bit of n is at a bit position defined by an integer multiple of the processor operand size m. This is depicted in blocks 506 and 508 of FIG. 10.

FIG. 11 shows an example of the foregoing bit shifting in the second register 610 wherein n=28606 and m=7 bits. Fifteen bits are required to represent n=28686, with the most significant binary bit found in the $2^{14}$ bit position. Because fifteen bits are required to represent n, a minimum of 3 processor slices 618 are required to operate on the full operand value of n, hence h=3. To reduce the number of operations, the bits of modulus n are shifted up in the more significant bit direction until the most significant bit of n 614 is in a position 620 defined by an integer multiple (denoted "h" in FIG. 11) of m. In the example, the bits of modulus n are shifted up six places so that the most significant bit of n is at the most significant bit position of the third processor slice.

After the bit shifting operation is concluded, the value of the second register 610 is repeatedly subtracted from the value of the first register 602 until the value in the first register 602 is less than the value of the modulus n, yielding the value of $2^{k+1}$ mod(n). This process is depicted in blocks 512 and 514 of FIG. 10. Finally, as shown in blocks 516 and 518, the modularly reduced value $2^{k+1}$ mod(n) is squared $\log_2(k)$ times, to produce the value of $2^{2k}$ mod(n).

Having thus described a preferred embodiment of a high speed modular exponentiator, it should be apparent to those skilled in the art that certain advantages of the within system have been achieved. It should also be appreciated that various modifications, adaptations, and alternative embodiments thereof may be made within the scope and spirit of the present invention. For example, while the present invention is well suited to cryptographic systems implemented with special purpose processors, it is also useful in non-cryptographic systems and may be implemented in general purpose processors as well. In such cases, one or more computer-executable programs of instructions implementing the invention may be tangibly embodied in a computer-readable program storage device such as a floppy disk or other storage media.

CONCLUSION

This concludes the description of the preferred embodiment of the invention. In summary, the present invention provides an efficient method for performing modular reductions and for determining a Montgomery value for cryptographic algorithms.

The foregoing description of the preferred embodiment of the invention has been presented for the purposes of illustration and description. It is not intended to be exhaustive or to limit the invention to the precise form disclosed. Many modifications and variations are possible in light of the above teaching It is intended that the scope of the invention be limited not by this detailed description., but rather by the claims appended hereto.

What is claimed is:

1. A method of computing a modular exponentiation $2^{2k}$ mod(n) for use in a cryptographic system using a processor accepting an m-bit operand, wherein n is a modulus value, and k is a number of bits used to represent n, comprising the steps of:

configuring a first register such that there is a one in a $2^{(h*m)+1}$ bit position of the first register and a zero in all less significant bit positions in the first register, wherein h is the smallest integer such that the product (h*m) is not less than k;

loading k bits representing the value of n into a second register, the second register comprising an integer multiple of m bit positions;

shifting the k bits representing the value of n in the second register in a most significant bit direction until the most significant non-zero bit of n is at a bit position defined by an integer multiple of m;

repeatedly subtracting the value of the second register from the first register until the value of the first register is less than the value of the modulus n;

squaring the modularly reduced value in the first register $\log_2(k)$ times to produce the value $2^{2k}$ mod(n), where $\log_2(k)$ is an integer;

employing the value $2^{2k}$ mod(n) for determining a cryptographic key.

2. The method of claim 1, wherein the value of the second register is subtracted from the value of the first register m bits at a time.

3. The method of claim 1, wherein the step of configuring the first register such that there is a one in the $2^{(h*m)+1}$ bit position of the first register and a zero in all less significant bit positions in the first register comprises the steps of:

clearing the first register; and loading a one in the $2^{(h*m)+1}$ bit position of the first register.

4. A method of computing a modular exponentiation $2^{2k}$ mod(n) in a cryptographic system having a processor for accepting an m-bit operand, wherein n is a modulus value, and k is a number of bits used to represent n, comprising the steps of:

configuring a first register such that there is a 1 in the $2^{(h*m)+1}$ bit position of the first register and a zero in all less significant bit positions in the first register, wherein h is the smallest integer such that the product (h*m) is not less than k;

configuring a second register such that the value of n is represented in the second register;

shifting the bits representing the value of n in the second register in a most significant bit direction until the most significant non-zero bit of n is at the (h*m)−1 bit position;

modularly reducing the value in the first register by the value of the second register;

squaring the modularly reduced value in the first register $\log_2(k)$ times to produce the value $2^{2k}$ mod(n), where $\log_2(k)$ is an integer; and employing the value $2^{2k}$ mod(n) for determining a cryptographic key.

5. The method of claim 4, wherein the step of modularly reducing the value of the first register by the value of the second register comprises the step of repeatedly subtracting the value of the second register from the value of the first register until the value of the first register is less than the value of the modulus n.

6. The method of claim 5, wherein the second register is subtracted from the first register m bits at a time.

7. A method of computing a modular exponentiation $2^{2k}$ mod(n) in a cryptographic system having a processor for accepting an m-bit operand, wherein n is a modulus value, and k is a number of bits used to represent n, comprising the steps of:

configuring a first register such that there is a one in the $2^{(h*m)+1}$ bit position of the first register and a zero in all less significant bit positions in the first register, wherein h is the smallest integer such that the product (h*m) is not less than k;

configuring a second register such that the most significant non-zero bit of n is at an (h*m)−1 bit position;

modularly reducing the value in the first register by the value of the second register;

squaring the modularly reduced value in the first register $\log_2(k)$ times to produce the value $2^{2k}$ mod(n), where $\log_2(k)$ is an integer; and employing the value $2^{2k}$ mod(n) for determining a cryptographic key.

8. The method of claim 7, wherein the step of modularly reducing the value of the first register by the value of the second register comprises the step of repeatedly subtracting the value of the second register from the value of the first register until the value of the first register is less than the value of the modulus n.

9. The method of claim 8, wherein the value of the second register is subtracted from the value of the first register m bits at a time.

10. An apparatus for computing $2^{2k}$ mod(n) for use in a Montgomery algorithm, wherein n is a modulus value, and k is a number of bits used to represent the modulus n, comprising:

a processor accepting and performing operations on an m-bit operand where m is an integer greater than one, the operations including subtraction, bit shifting, and squaring;

a first register communicatively coupled to the processor, for storing a number representing $2^{(h*m)+1}$, wherein h is the smallest integer such that the product (h*m) is not less than k;

a second register communicatively coupled to the processor, the second register including an integer multiple of m bit positions and storing the modulus n such that the most significant non-zero bit of the modulus n is at a bit position defined by an integer multiple of m;

wherein said processor is programmed to repeatedly subtract the value of the second register from the first register until the value of the first register is less than the value of the modulus n, and to square the modularly reduced value in the first register $\log_2(k)$ times, wherein $\log_2(k)$ is an integer.

11. An apparatus for computing $2^{2k}$ mod(n), for use in a Montgomery algorithm using a processor accepting an m-bit operand, wherein n is a modulus value, and k is a number of bits used to represent n, comprising:

means for configuring a first register such that there is a one in the $2^{(h*m)+1}$ bit position of the first register and a zero in all less significant bit positions in the first register, wherein h is the smallest integer such that the product (h*m) is not less than k;

means for loading k bits representing the value of n into a second register, the second register comprising an integer multiple of m bit positions;

means for shifting the k bits representing the value of n in the second register in a most significant bit direction until the most significant non-zero bit of n is at a bit position defined by an integer multiple of m;

means for modularly reducing the value in the first register by the value of the second register; and means for squaring the modularly reduced value in the first register $\log_2(k)$ times, where $\log_2(k)$ is an integer.

12. The apparatus of claim 11, wherein the means for modularly reducing the value in the first register by the value of the second register comprises means for repeatedly subtracting the value of the second register from the first register until the value of the first register is less than the value of the modulus n.

13. The apparatus of claim 11, wherein the means for modularly reducing the value in the first register by the value of the second register performs subtractions m bits at a time.

14. A method for computing $2^{2k}$ mod(n) for use in a Montgomery algorithm, wherein n is a modulus value, and k is a number of bits used to represent the modulus n, comprising the steps of:

accepting and performing operations with a processor on an m-bit operand where m is an integer greater than one, the operations including subtraction, bit shifting, and squaring;

storing, with a first register communicatively coupled to the processor, a number representing $2^{(h*m)+1}$, wherein h is the smallest integer such that the product (h*m) is not less an k;

storing, with a send rester communicatively coupled to the processor, an integer multiple of m bit positions and storing the modulus n such that the most significant non-zero bit of the modulus n is at a bit position defined by an integer multiple of m;

repeatedly subtracting the value of the second register from the first register until the value of the first register is less than the value of the modulus n, and to square the modularly reduced value in the first register $\log_2(k)$ ties, wherein $\log_2(k)$ is an integer.

* * * * *